June 18, 1968     R. M. BURRESS     3,389,046
TUBULAR REPAIR JOINT AND INSERT USED THEREIN
Filed March 30, 1964
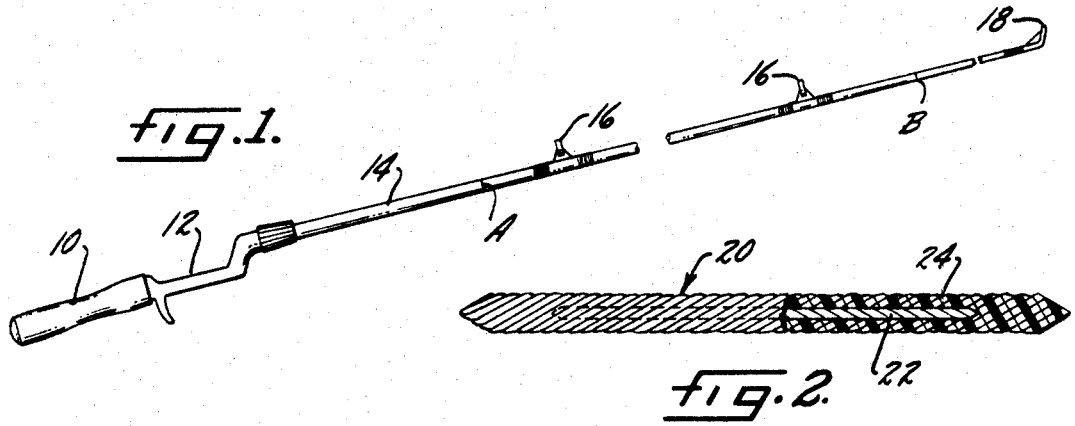
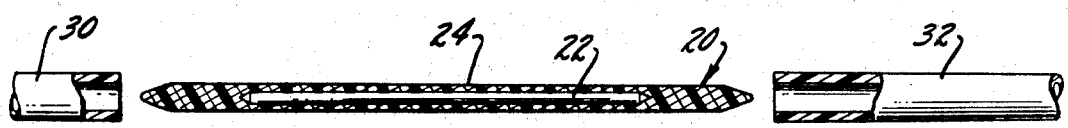
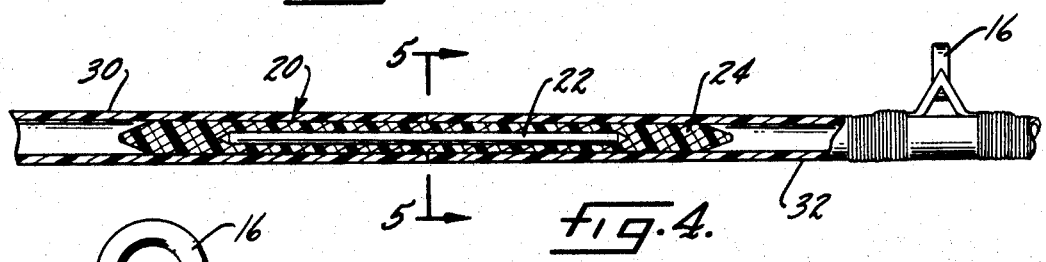
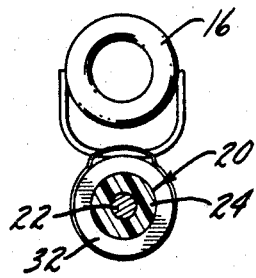
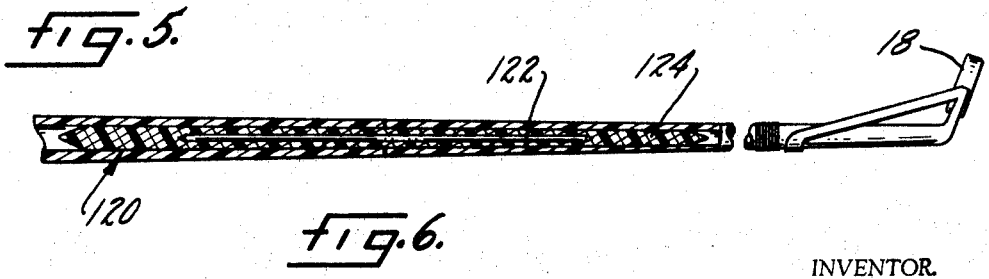
INVENTOR.
Robert M. Burress,
BY
Trask, Jenkins & Hanley
Attorneys.

3,389,046
TUBULAR REPAIR JOINT AND
INSERT USED THEREIN
Robert M. Burress, 928 Westfield Blvd.,
Indianapolis, Ind. 46220
Filed Mar. 30, 1964, Ser. No. 355,596
8 Claims. (Cl. 161—194)

ABSTRACT OF THE DISCLOSURE

The disclosure herein relates to a method and apparatus for repairing hollow glass-fiber fishing rods without impairing the resiliency of the rod. An insert comprising a resilient metal core covered with continuous glass fibers and coated with a self curing resin is fitted within the hollow shafts of the fishing rod and the shaft sections are then pushed into an abutting relationship.

This invention relates to a repair joint formed between the broken end sections of a tubular glass fiber fishing rod shaft, and to a resin impregnated, glass fiber covered, resilient metal cored insert used to make said repair joint.

In a commonly used fishing rod construction, the shaft of the rod is a lightweight elongated tapered hollow glass fiber tube of carefully graduated size and flexibility. Its walls consist of continuous glass fibers running longitudinally of the rod, embedded in a matrix of hard synthetic resin or plastic. The hollow shaft is formed over a tapered mandrel which is subsequently withdrawn, and the wall thickness and taper and the lay of the glass fibers is carefully controlled. Such a shaft has great strength and resilience. But when it breaks, the break leaves two hollow tubular end sections defined by thin walls which are weak transversely and circumferentially. Many expedients have been tried to repair such breaks in a manner which would restore the shaft to its original strength and resilience.

It is the object of the present invention to provide a method and apparatus by which breaks in such rods can be repaired to give strength and resilience substantially equal to that of the original rod, which will preserve the "action" and appearance of the rod, and which will avoid stress concentrations at points adjacent the repair tending to produce other breaks in the rod. It is a further object of the invention to provide a repair which can be made by persons of ordinary mechanical skill.

In accordance with the invention, the repair is made by the use of a special insert consisting of a spring steel core of predetermined size, encased by a covering of glass fiber in a matrix of hardened synthetic resin, with the glass fibers continuous and extending lengthwise of the insert, but preferably slightly twisted so that they lie in a helix about the spring steel core. The core is tapered at its ends, and the glass-fiber covering extends beyond the ends of the core for the purpose of distributing stress away from the ends of the core. The core is preferably from about one-fourth to one-half the thickness of the insert. The inserts are preferably made in standard sizes, and are desirably sold in sets of a plurality of sizes suitable for repairing breaks at different points along a tapered fishing rod shaft.

In using these special inserts to repair a break in a hollow fishing rod shaft, the broken ends of the shaft are cut off square and trimmed back to remove ragged and split portions, so that the insert will lie in intact portions of the rod. An insert of appropriate size is then selected, preferably the smallest size in the set which is large enough to be dressed down to fit within the trimmed ends of the shaft. The selected insert is dressed down, as with a file or sandpaper or other abrasive, and is desirably finished by scraping with a knife or scraping tool, so that its opposite ends will closely fit in the trimmed end sections of the shaft with such ends abutting adjacent the center of the insert. Care should be taken to maintain a uniform wall thickness of the glass-fiber covering of the insert, in order to locate the spring steel core on or close to the axis of the shaft. The fitted insert is then coated with a self-curing raw resin which bonds both to the insert and to the inside of the shaft, and the insert is inserted in the trimmed ends of the shaft and the ends are brought together to form a close butt joint at approximately the center of the insert. The resin is allowed to cure with the joined shaft supported so that its two sections are straight and have their line guides in proper alignment.

A number of self-curing hard adhesive resins which have the necessary bonding characteristics are available on the market. I prefer to use a polyester resin which is activated by the addition of a catalyst immediately prior to use, such as that available on the market under the trademark "Rocket Resin" from the Fiberglas Corporation or that available on the market under the trademark "Resitone" from the Herter Corporation.

In accordance with the invention, a repair kit may preferably contain a supply of raw resin and of catalyst therefor, and three special inserts about 2½" long. The largest may be ⅜" in diameter and contain a core of approximately ³⁄₃₂" in diameter, the middle size may be ¼" outside diameter and contain a core of from ⅟₁₆ to ³⁄₃₂ inch in diameter, and the smallest may be ³⁄₁₆" in diameter and contain a core of approximately ³⁄₆₄" in diameter.

The accompanying drawing illustrates my invention. In such drawing:

FIG. 1 is a side elevation of a fishing rod containing two repairs in accordance with the invention, one near the large end of the shaft and one near the small end of the shaft;

FIG. 2 is a side elevation of a special insert in accordance with the invention, with parts broken away and shown in section;

FIG. 3 is a diagrammatic view showing an insert prepared for insertion in the trimmed broken ends of a shaft;

FIG. 4 is a view similar to FIG. 3, showing a completed repair;

FIG. 5 is a section taken on the line 5—5 of FIG. 4; and

FIG. 6 is a sectional view of a completed repair in a smaller section of the fishing rod shaft.

The fishing rod shown in FIG. 1 comprises a handle 10 having a reel seat 12 and joined to a glass-fiber shaft 14 of hollow tapered construction and provided with line guides 16 along its length and a tip guide 18 at its remote end. The rod contains repairs at points A and B. The special insert used in making the repair at point A was originally like the insert 20 shown in FIG. 2. This consists of a central spring-steel core 22, and a casing 24 of glass-fiber bound in a matrix of hard synthetic resin. For inserts 20 in the size range from ¼" to ⅜" diameter, I have found it convenient to use spring steel wire of .094" diameter for the core, and to cut the core to a length of approximately 2¼ inches and to taper its ends. The covering 24 on the core 22 may be formed by saturating a bundle of glass-fibers or strands of glass-fibers with a hardenable synthetic resin, positioning the strands about the core 22, and hardening the resin while this relationship is maintained. Preferably, the saturated glass-fiber bundle is slightly twisted about the axis of the core 22, which causes the fibers to lie in a helix about the core 22 and helps to locate the core 22 centrally in the fibers during the curing process. The covering 24 extends well beyond the core 22, and in an insert of the size indicated may extend approximately ¼″ beyond each end.

Repair of a break between broken ends 30 and 32 of a fishing rod shaft is illustrated in FIG. 3. The broken ends 30 and 32 are first trimmed to cut off all split and damaged portions at the break, and the ends are faced smooth and square so that the rod sections 30 and 32 will fit evenly together. An insert 20 made as shown in FIG. 2 is dressed down over the right half of its length to fit smoothly and snugly in the smaller section 32 of the rod. This may be done with an abrasive tool such as a grinding wheel or file, but the final finish and fit is desirably made by scraping lengthwise with a knife. Care is taken not to expose the core 22, which should preferably lie on the axis of the finished insert. When the right half length of the insert 20 has been smoothly and snugly fitted to the section 32 of the rod shaft, then the left half length of the insert is dressed similarly to the smooth and snug fit in the section 30 of the rod shaft. When the insert 20 is completely dressed to fit the rod sections 30 and 32, it is coated with the self-curing adhesive resin which bonds both to the surface of the insert 20 and to the inside surfaces of the shaft sections 30 and 32. The resin used may be the same as that used in making the insert shown in FIG. 2, and I prefer to use a polyester resin which is activated immediately before use by the addition of a catalyst or hardener and which hardens by curing without the evaporation of a solvent. The dressed and adhesive-coated insert 20 is then inserted in the sections 30 and 32 of the broken rod shaft, and such sections are brought together to abut at approximately the center of the insert 20, as shown in FIG. 4. Care is taken to align the guides 16 at opposite sides of the joint, and the rod is laid on a suitable support which holds the repaired section straight while the resin is allowed to cure.

As shown in FIG. 5, the completed repair will have the core 22 of the insert located on the axis of the repaired shaft 30–32, and the space between the core 22 and the wall of the shaft will be substantially completely filled by the glass fiber cover 24 of the insert 20, and the outer surface of the insert 20 will be firmly bonded to the inner surface of the rod sections 30 and 32. The core 22 will extend in opposite directions into the abutting ends of the rod sections 30 and 32, but will terminate short of the ends of the insert 20, whose cover portion 24 will extend farther into the rod sections 30 and 32 and thus serve to distribute stress away from the ends of the core 22 when the rod is flexed.

Similar repairs can be made near the tip end of the rod, where the shaft thickness and wall thickness may be thinner, as illustrated in FIG. 6. In this case, the insert 120 is made in the same way as the insert 20, except that a smaller core 122 is used. I have found it convenient to use as a core for a small insert a spring wire having a diameter of 0.048″. This is covered with a covering 124 of longitudinally extending glass fibers bound together with a hard resin such as polyester resin. A joint is made with such insert in the same manner as described in connection with FIGS. 3–5.

The repair in accordance with the invention restores both the usefulness and the appearance of the rod. The repair is strong and resilient so that the rod has substantially the same action and feel as the original rod.

I claim as my invention:

1. A repair joint between the broken end sections of a tubular glass-fiber fishing-rod shaft, comprising an insert extending into and between the broken end sections, with such sections positioned in substantially abutting aligned relation and meeting at a point intermediate the length of the insert, said insert comprising a central axial core of strong resilient metal, of a diameter substantially smaller than the inside diameter of the joined sections, an insert cover of longiutdinal glass fibers held in a hardened matrix of synthetic resin about said core, said cover substantially filling the space between the core and the overlying walls of the shaft sections and extending lengthwise beyond the core, and a hardened layer of self-curing resin bonding said overlying walls to the insert cover over substantially its entire length.

2. A repair joint as set forth in claim 1 in which the insert core has a diameter of the order of one-fourth to one-half the outside diameter of the insert cover.

3. A repair joint as set forth in claim 1 in which the insert cover is composed substantially of continuous glass fibers running lengthwise of the insert.

4. A repair joint as set forth in claim 3 in which the glass fibers lie in a long-pitch helix about the core.

5. An insert for repairing a broken tubular glass-fiber fishing-rod shape, comprising a core formed by a straight length of strong resilient metal of a diameter substantially smaller than the diameter of the insert, said core being solid and disposed at the center of the insert along the axis thereof, a cover of glass fibers held in a hardened matrix of cured synthetic resin, said cover tightly encasing said core and extending lengthwise beyond its ends, and being adapted to be abraded as with a grinding wheel and to be scraped with a knife to dress the same down to fit into broken ends of the shaft sections.

6. An insert as set forth in claim 5, wherein the core insert has a diameter of the order of one-fourth to one-half the ouside diameter of the insert cover.

7. An insert as set forth in claim 5, wherein the cover is composed substantially of continuous glass fibers running lengthwise of the insert.

8. An insert as set forth in claim 7, wherein the glass fibers lie in a long pitch helix about the core.

References Cited

UNITED STATES PATENTS

| | | | |
|---|---|---|---|
| 934,711 | 9/1909 | Chapman | 206—47 X |
| 1,472,088 | 10/1923 | Puckett | 206—47 X |
| 1,497,952 | 6/1924 | Smith | 156—294 X |
| 2,405,541 | 8/1946 | Gerner | 285—16 X |
| 2,412,081 | 12/1946 | Droll | 156—91 |
| 3,176,836 | 4/1965 | Gunn | 206—47 X |
| 3,251,461 | 5/1966 | Smith | 206—47 |
| 2,040,126 | 5/1936 | Grieve | 144—309 |
| 2,511,168 | 6/1950 | Martin et al. | 156—293 X |
| 2,817,620 | 12/1957 | Golick et al. | 156—310 X |
| 2,984,937 | 5/1961 | Rendon | 46—220 |
| 3,086,315 | 4/1963 | Fasano | 46—220 X |
| 3,254,443 | 6/1966 | Olson | 46—220 |
| 3,235,289 | 2/1966 | Jones | 156—304 X |
| 3,265,480 | 8/1966 | Hicks | 156—2 X |

FOREIGN PATENTS 190,273   6/1957   Austria.

EARL M. BERGERT, *Examiner.*

HAROLD ANSHER, *Primary Examiner.*